(12) United States Patent
Verhulst

(10) Patent No.: US 9,479,103 B2
(45) Date of Patent: Oct. 25, 2016

(54) VARIABLE SPEED DRIVE SYSTEM, METHOD FOR OPERATING A VARIABLE SPEED DRIVE SYSTEM AND METHOD FOR REFRIGERATING A HYDROCARBON STREAM

(71) Applicant: SHELL OIL COMPANY, Houston, TX (US)

(72) Inventor: Michel Pieter Alfons Verhulst, Moerdijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 14/423,940

(22) PCT Filed: Aug. 29, 2013

(86) PCT No.: PCT/EP2013/067870
§ 371 (c)(1),
(2) Date: Feb. 25, 2015

(87) PCT Pub. No.: WO2014/033201
PCT Pub. Date: Mar. 6, 2014

(65) Prior Publication Data
US 2015/0303855 A1    Oct. 22, 2015

(30) Foreign Application Priority Data

Aug. 31, 2012   (EP) .................................. 12182645

(51) Int. Cl.
*H02P 7/32* (2006.01)
*H02P 23/04* (2006.01)
(Continued)

(52) U.S. Cl.
CPC .............. *H02P 23/04* (2013.01); *F25J 1/0022* (2013.01); *F25J 1/0284* (2013.01); *F25J 1/0298* (2013.01); *H02P 29/0033* (2013.01); *H02P 29/0038* (2013.01)

(58) Field of Classification Search
CPC ...... H02P 29/0038; H02P 29/50; H02P 8/18; H02M 1/12; H02M 1/14; H02J 1/02; H02J 3/01
See application file for complete search history.

(56) References Cited

U.S. PATENT DOCUMENTS 4,317,074 A * 2/1982 Erth ........................ H02P 27/06
                                                              318/729
4,404,008 A    9/1983 Rentler et al.
(Continued)

FOREIGN PATENT DOCUMENTS

DE          3521060         12/1985
DE          10326816        1/2005
(Continued)

OTHER PUBLICATIONS

Won Jin Cho, Mitigation of Harmonic and Inter-harmonic Effects in Nonlinear Power Converters, The University of Texas at Austin, pp. 29-67.*

(Continued)

*Primary Examiner* — Eduardo Colon Santana
*Assistant Examiner* — Bickey Dhakal

(57) ABSTRACT

A variable speed drive system employing an electric motor and a frequency converter arranged between an AC power source and the electric motor is operated. The frequency converter functions to convert AC power obtained from the AC power source at a source frequency to converted power at a variable drive frequency. A mechanical assembly can be coupled to the electric motor. Electric modulation circuitry is provided interacting with the frequency converter. It is arranged to impose fluctuations, independently from any torsional excitation in the mechanical assembly and the AC power source, in the inter-harmonic frequencies of inter-harmonic currents generated in the frequency converter.

12 Claims, 5 Drawing Sheets

(51) Int. Cl.
*H02P 29/00* (2016.01)
*F25J 1/00* (2006.01)
*F25J 1/02* (2006.01)

(56) References Cited

U.S. PATENT DOCUMENTS

| | | | |
|---|---|---|---|
| 4,858,100 A * | 8/1989 | Tatara | H02M 1/12 318/729 |
| 5,657,643 A | 8/1997 | Price | |
| 5,669,234 A | 9/1997 | Houser et al. | |
| 5,832,745 A | 11/1998 | Klein Nagelvoort et al. | |
| 6,253,574 B1 | 7/2001 | Stockmann et al. | |
| 6,295,833 B1 | 10/2001 | Hoffart et al. | |
| 6,308,531 B1 | 10/2001 | Roberts et al. | |
| 6,370,910 B1 | 4/2002 | Grootjans et al. | |
| 6,658,891 B2 | 12/2003 | Reijnen et al. | |
| 6,962,060 B2 | 11/2005 | Petrowski et al. | |
| 7,114,351 B2 | 10/2006 | Jones et al. | |
| 7,127,914 B2 | 10/2006 | Roberts et al. | |
| 7,173,399 B2 | 2/2007 | Sihler et al. | |
| 7,246,500 B2 * | 7/2007 | Singh | F25B 49/027 62/181 |
| 9,054,629 B2 * | 6/2015 | Schramm | H02P 21/05 |
| 2006/0232250 A1 | 10/2006 | Sihler et al. | |
| 2006/0244425 A1 | 11/2006 | Sihler | |
| 2008/0141711 A1 * | 6/2008 | Roberts | F25J 1/0022 62/611 |
| 2013/0181654 A1 * | 7/2013 | Rozman | H02M 5/4585 318/721 |

FOREIGN PATENT DOCUMENTS

| | | | |
|---|---|---|---|
| NL | WO 2011032958 A1 * | 3/2011 | F01D 15/04 |
| WO | 2008020044 | 2/2008 | |
| WO | 2011121049 | 10/2011 | |

OTHER PUBLICATIONS

PCT International Search Report, Application No. PCT/EP2013/067870 dated Aug. 29, 2014.

Johnsen et al., "LNG Production on floating platforms"presented at Gastech 1998 (Dubai).

Roberts et al., "Large capacity single train AP-X(TM) Hybrid LNG Process", Gastech 2002, Doha, Qatar (Oct. 13-16, 2002).

Martin et al., "LIQUEFIN: An Innovative Process to Reduce LNG Costs," presented at the 22nd World Gas Conference in Tokyo, Japan (Jun. 1-5, 2003).

* cited by examiner

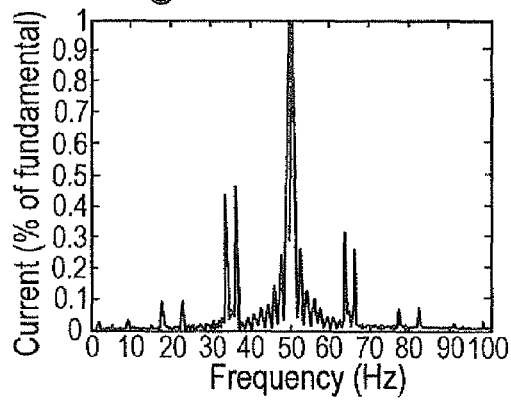
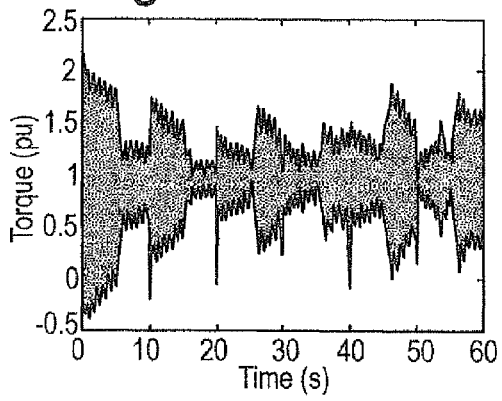
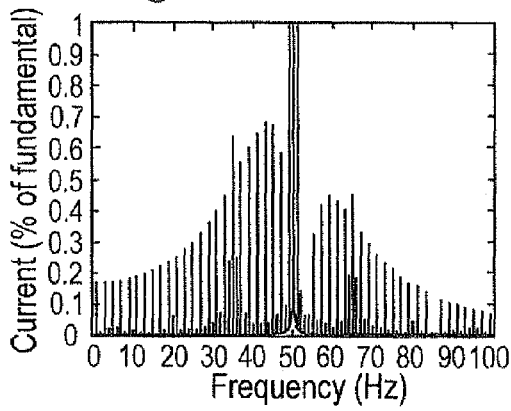
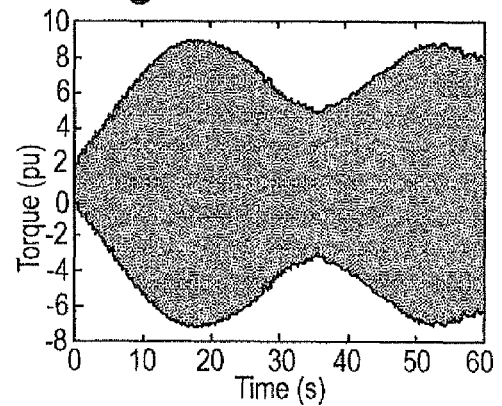
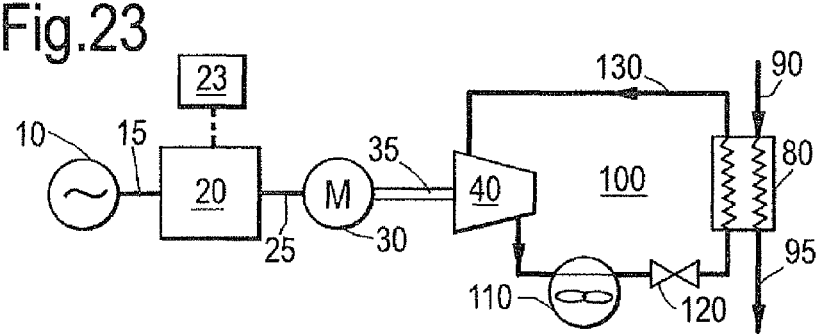

VARIABLE SPEED DRIVE SYSTEM, METHOD FOR OPERATING A VARIABLE SPEED DRIVE SYSTEM AND METHOD FOR REFRIGERATING A HYDROCARBON STREAM

CROSS-REFERENCE TO RELATED APPLICATIONS

The present application is a National Stage (§371) application of PCT/EP2013/067870, filed Aug. 29, 2013, which claims the benefit of European Application No. 12182645.7, filed Aug. 31, 2012, which is incorporated herein by reference in its entirety.

BACKGROUND OF THE INVENTION

The present invention relates to a method of operating a variable speed drive system comprising an electric motor. In another aspect, the present invention relates to a variable speed drive system comprising an electric motor. In still other aspects, the invention relates to a method for refrigerating a hydrocarbon stream using a variable speed drive system or method of operating the same.

An example of a hydrocarbon feed stream that in the industry often requires to be refrigerated is natural gas, for instance in order to produce liquefied natural gas (LNG). Natural gas is a useful fuel source, as well as a source of various hydrocarbon compounds. It is often desirable to liquefy natural gas in an LNG plant at or near the source of a natural gas stream. LNG can be suitably stored and transported in bulk form.

A large number of LNG plants comprise one or more compressors in a refrigeration cycle wherein a refrigerant fluid is compressed as it is cycled in a refrigerant circuit. These compressors are loads that are traditionally directly driven by prime movers such as a steam turbine and/or a gas turbine, in some cases assisted by an electric motor as helper drive to assist the turbines and to start the cycle up. However, there is a growing interest in all-electric (exclusively electrically driven) mechanical refrigeration cycles, where the compressors are shaft-driven by a prime mover in the form of an electric motor only. Such motor may form part of a variable speed drive system.

It is a known phenomenon that shaft assemblies in strings of prime movers and loads may exhibit weakly dampened mechanical resonances. These mechanical resonances are often referred to as "torsional modes" or "torsional resonances". The frequency of such a torsional resonance may fall below the network synchronous frequency. The torque associated with a torsional resonance vibration can be large enough to cause mechanical damage. It is also a known phenomenon that such torsional resonance vibrations can be excited as a result of inter-harmonic current components that are generated in the power electronics used to power the electric motor.

Various solutions have been proposed in the past to address the risk of torsional resonance vibrations. Amongst these, U.S. Pat. No. 7,173,399 discloses an integrated torsional mode dampening system comprising a load commutated inverter system comprising a rectifier, a DC link and a load inverter; a sensor configured for sensing a signal representative of torque on a load side shaft; and an inverter controller configured for using the sensed signal for detecting the presence of a torsional vibration on the load side shaft and generating inverter control signals for damping the torsional vibration by modulating active power through the load inverter.

A drawback of the system disclosed on this US patent is that it needs a sensor for sensing torque on the load side shaft.

BRIEF SUMMARY OF THE INVENTION

In accordance with a first aspect of the present invention, there is provided a method of operating a variable speed drive system comprising an electric motor and a frequency converter arranged between an AC power source and the electric motor, the method comprising the steps of:

converting AC power obtained from the AC power source at a source frequency to converted power at a variable drive frequency that is unequal to the source frequency, wherein the converted power comprises inter-harmonic currents having additional frequency components at inter-harmonic frequencies that are unequal to integer multiples of the source frequency;

powering the electric motor with the converted power;

driving a mechanical assembly comprising at least a drive shaft and a mechanical load with the electric motor;

causing fluctuations in the inter-harmonic frequencies independently from any torsional excitation in the mechanical assembly and the AC power source.

In another aspect, the invention provides a variable speed drive system, comprising:

an electric motor;

a frequency converter arranged between an AC power source and the electric motor, to convert AC power obtained from the AC power source at a source frequency to converted power at a variable drive frequency that is unequal to the source frequency;

a mechanical assembly coupled to the electric motor comprising at least a drive shaft and a mechanical load; and electric modulation circuitry interacting with the frequency converter and arranged to cause fluctuations, independently from any torsional excitation in the mechanical assembly and the AC power source, in the inter-harmonic frequencies of inter-harmonic currents generated in the frequency converter.

In still another aspect the invention provides a method of refrigerating a hydrocarbon stream, comprising the steps of:

operating a variable speed drive system in accordance with the method as defined above, wherein the mechanical load comprises a compressor;

cycling a refrigerant fluid between compressing the refrigerant fluid with the compressor and cooling a hydrocarbon stream by heat exchanging the hydrocarbon stream against the refrigerant fluid.

BRIEF DESCRIPTION OF THE SEVERAL VIEWS OF THE DRAWINGS

The invention will be further illustrated hereinafter, using examples and with reference to the drawing in which:

FIG. 19 shows a plot of another input current spectrum, obtained by employing square-wave drive frequency variation having a period of 10 s, wherein frequency is plotted on the horizontal axis on a linear scale between 0 and 100 Hz and the current is plotted on the vertical axis on a linear scale of percentage of the current in the fundamental frequency between 0 and 1%;

FIG. 20 shows a plot of the torque (in per unit quantity) between elements 2 and 3 of the four mass model over time when excited with the inverter of FIG. 5 during 60 s with the input current spectrum of FIG. 19, wherein time is plotted on the horizontal axis on a linear scale between 0 and 60 s and the torque is plotted on the vertical axis on a linear per-unit scale between 2.5 and −0.5 pu;

FIG. 21 shows a plot of another input current spectrum, obtained by employing repetitive inverter firing angle modulation, wherein frequency is plotted on the horizontal axis on a linear scale between 0 and 100 Hz and the current is plotted on the vertical axis on a linear scale of percentage of the current in the fundamental frequency between 0 and 1%;

FIG. 22 shows a plot of the torque (in per unit quantity) between elements 2 and 3 of the four mass model over time when excited with the inverter of FIG. 5 during 60 s with the input current spectrum of FIG. 19, wherein time is plotted on the horizontal axis on a linear scale between 0 and 60 s and the torque is plotted on the vertical axis on a linear per-unit scale between 10 and −8 pu; and FIG. 23 shows a schematic of an apparatus and method for refrigerating a hydrocarbon stream employing the variable speed drive system of FIG. 1.

DETAILED DESCRIPTION OF THE INVENTION

For the purpose of this description, a single reference number will be assigned to a line as well as a stream carried in that line. Same reference numbers refer to similar components.

When a variable speed drive system is connected to an AC power source to drive a mechanical assembly comprising a mechanical load, torsional resonances may be excited in the mechanical assembly and/or the AC power source, as a result of inter-harmonic currents that are generated within the variable speed drive system.

It is presently described how excessive excitation of torsional resonances can be avoided by causing fluctuations in the inter-harmonic frequencies that are generated in the frequency converter, independently from any torsional excitation in the mechanical assembly and the AC power source.

By imposing fluctuations on the inter-harmonic frequencies, prolonged excitation of a torsional resonance is avoided as the inter-harmonic frequencies continue to be changed. If this is done regardless of whether any torque resonance has been excited, it is achieved that no single torsional resonance can build up into excessively large torque. As a result, the motor can be driven at more or less any speed and there is no need to measure or sense the actual torque.

The fluctuations do not need to be random; the fluctuations may be applied in accordance with a pre-determined pattern of fluctuations. The fluctuations may consist of repeatedly and periodically changing of the inter-harmonic frequencies, according to a fully pre-determined wave form. Notwithstanding, the pre-determined wave form may be drive-frequency specific and varying as a function of drive frequency in a pre-determined way.

The inter-harmonic frequencies can conveniently be changed by varying the drive frequency (or motor speed) or by varying a firing angle of firing pulses of an inverter comprising switching components activated by firing pulses. Only relatively small fluctuations are necessary, so that the effect thereof on the load is only marginal.

Figure 1:
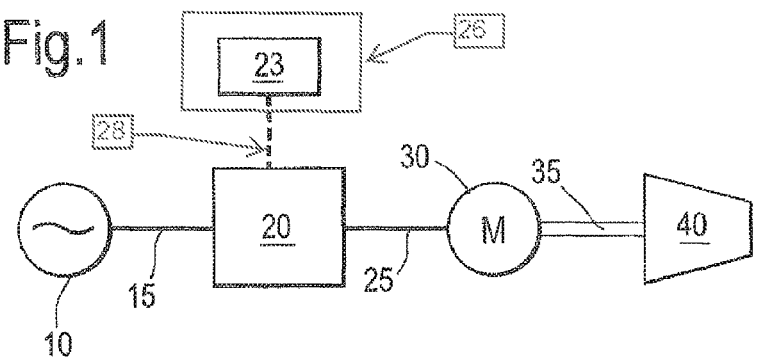
FIG. 1 is a schematic representation of a variable speed drive system coupled to an AC power source and a mechanical load.

FIG. 1 schematically shows a variable speed drive system coupled to an AC power source, represented by a generator 10, via a power line 15. The variable speed drive system further comprises an electric motor 30. The electric motor 30 is coupled to a mechanical assembly comprising a drive shaft 35 and mechanical load 40. The drive shaft 35 is drivingly engaged with the electric motor 30 and the mechanical load 40 so that the mechanical load 40 can be driven by the electric motor 30. The electric motor 30 is electrically connected to a frequency converter 20 via an electric line 25. The frequency converter 20 is arranged between the AC power source and the electric motor 30.

The AC power source typically comprises at least the generator 10, which is driven by a driver of some kind (for example as a hydraulic turbine, a gas turbine, a steam turbine, a motor). Thus the AC power source generally contains a second mechanical assembly, in addition to the mechanical assembly driven by the electric motor 30.

The frequency converter is arranged to convert AC power obtained from the AC power source via power line 15 at a source frequency, to converted power in the electric line 25 at a variable drive frequency that is unequal to the source frequency. The source frequency is often 50 Hz or 60 Hz.

Figure 2:
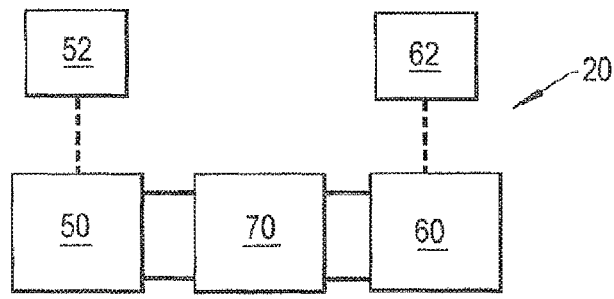
FIG. 2 is a schematic representation of a frequency converter that can be used in FIG. 1.

FIG. 2 schematically shows a generic example of a suitable frequency converter 20 that may be used. It comprises a source rectifier 50, a load inverter 60, mutually coupled via a DC link 70. The DC link 70 may comprise a capacitance in case the inverter is a voltage source inverter, or an inductance in case the inverter is a current source inverter. The proposed methods to avoid excessive excitation of torsional resonances can be applied in either case, but in practice the need to address inter-harmonics is more prominent in case of current source inverters. Thus, the methods proposed herein are primarily intended to be applied to variable speed drive systems having a power rating of 25 MW and higher as no voltage source inverters are generally available for such high powers. At present the maximum available power rating for load commutated inverters (LCI) is 120 MW.

The load inverter 60 is typically a switched device which may comprise switching components in the form of gated semiconductor devices. Examples include gated transistors such as IGBT (insulated-gate bipolar transistor) and thyristors. The switching components are controlled via inverter control circuitry 62, which typically generates firing pulses to control the switching components. The source rectifier 50 may also contain switching components, typically in the form of gated semiconductor devices, which are controlled via rectifier control circuitry 52.

The converting of the AC power to the converted power with the frequency converter 20 thus typically involves forming a rectified signal by rectifying the AC power in source rectifier 50 and converting the rectified signal to the converted power typically involving activating the switching components by firing pulses.

Despite the filter elements in the DC link 70, the rectified current in the DC link in practice is not perfectly smooth but will have a relatively small ripple. Signal components at integer multiples of 6 times (or 12, in case of a 12-pulse load inverter) the drive frequency produced by the load inverter switching pattern sampling the output frequency cause currents to flow back to the source rectifier, where they are again sampled by the rectifier switching pattern. Thus additional frequencies are generated, which may not be at integer multiples of the fundamental source frequency. These are referred to as inter-harmonic frequencies of inter-harmonic currents.

Figure 3:
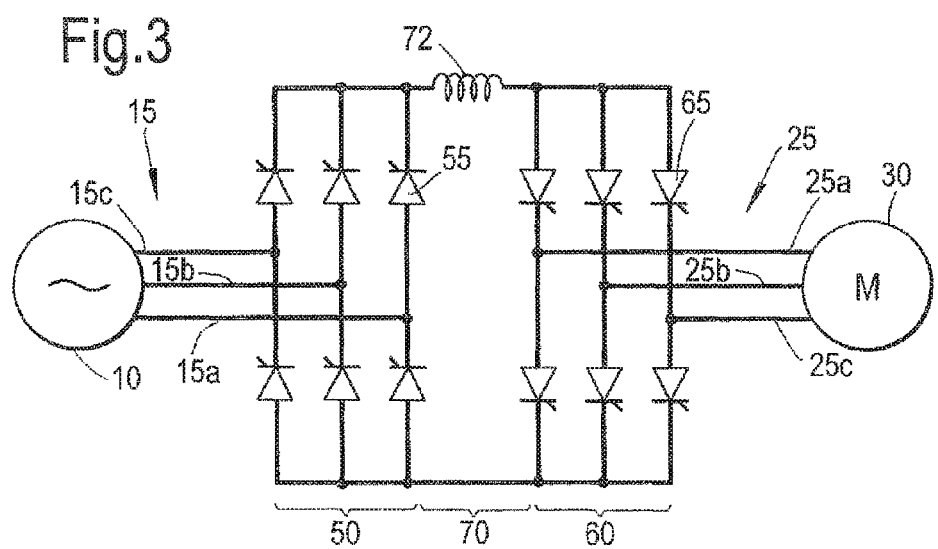
FIG. 3 is a schematic representation of a load commutated inverter that can form part of the frequency converter of FIG. 2.

FIG. 3 shows an example of a so-called load commutated inverter (LCI), which is based on thyristors. The control circuitry is not depicted, for reasons of clarity. The source rectifier 50 is typically active, as in this type of inverter the power of the output cannot be controlled by the load inverter 60. The example shown has a three phase source rectifier (the phases are provided in power lines 15a, 15b, 15c) and a three phase load inverter (the output phases are on three drive lines 25a, 25b, 25c), and each phase employs two thyristors, globally depicted with references 55 and 65. In this case the source rectifier and the load inverter are therefore 6-pulse systems. The DC link 70 uses an inductance 72. Suitable LCI devices are commercially available from various companies including ABB and Siemens for powers up to about 120 MW. In case the frequency converter 20 is based on an LCI converter, the electric motor 30 should be a synchronous motor.

The inter-harmonic content of the current spectrum is dependent on the type of frequency converter. As example various 12-pulse load commutated inverters are shown in FIGS. 4 to 6.

Figure 4:
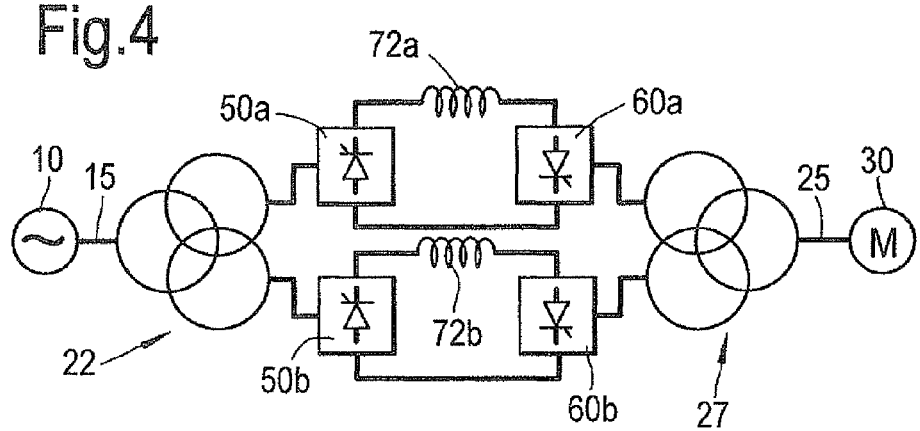
FIG. 4 is a schematic representation of a load commutated inverter with transformers that can form part of the frequency converter of FIG. 2.

FIG. 4 schematically shows a load commutated inverter having in essence two separate 6-pulse frequency converters as shown in FIG. 3, operated with a phase angle between them and fed from the generator 10 via a multi-phase input transformer 22. The output converted power is fed to the electric motor 30 via a multi-phase output transformer 27. Each of the separate 6-pulse converters has a rectifier (50a, resp. 50b), a load inverter (60a, resp. 60b), and DC link (72a, resp. 72b). The DC links 72a and 72b essentially do not influence each other.

Figure 5:
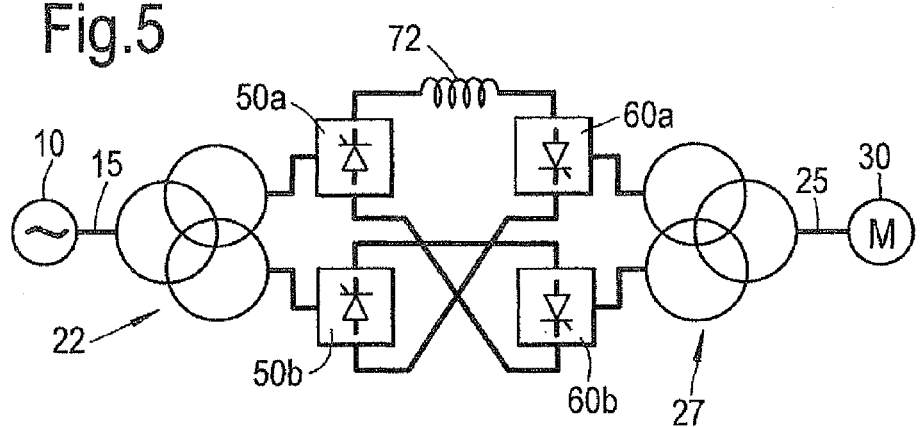
FIG. 5 is a schematic representation of a load commutated inverter with transformers that can form part of the frequency converter of FIG. 2.

In the LCI of FIG. 5 there are two 6-pulse rectifiers (50a, resp. 50b) and two 6-pulse inverters (60a, resp. 60b) all series connected via one DC link 72. In this case certain motor harmonics are cancelled in the DC link 72 while others are increased compared to the example of FIG. 4.

Figure 6:
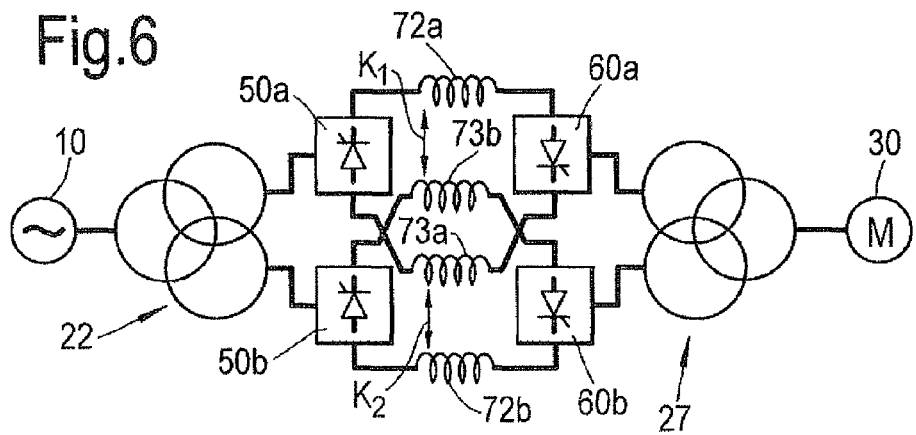
FIG. 6 is a schematic representation of a load commutated inverter with transformers that can form part of the frequency converter of FIG. 2.

FIG. 6 has two rectifier-DC link-inverter circuits, but a magnetic coupling $K_1$ is created between inductor 72a of one of the circuits and inductor 73b of the other circuit.

Likewise, a second magnetic coupling $K_2$ is created between inductor 73a of one of the first of the two circuits and inductor 72b of the other circuit.

In each of the examples given in FIGS. 4 to 6 some of the harmonics will cancel out but the created inter-harmonics are not.

Referring to FIG. 1 again, electric modulation circuitry 23 is provided to interact with the frequency converter 20. It may form part of, or interact with, the rectifier control circuitry 52 and/or the inverter control circuitry 62. The electric modulation circuitry 23 is arranged to impose fluctuations on the inter-harmonic frequencies of the inter-harmonic currents generated in the frequency converter 20. The fluctuations may consist of repeatedly and periodically changing of the inter-harmonic frequencies according to a pre-programmed or pre-determined fluctuation pattern. It can be done totally independently from any torsional excitation in the mechanical assembly and the AC power source, regardless to which extent any torsional resonance is excited.

The variable speed drive system in operation is used as follows. AC power from the AC power source is obtained at a source frequency, and converted in the frequency converter 20 to converted power at a variable drive frequency. The drive frequency may be unequal to the source frequency. The electric motor 30 is powered with the converted power. The electric motor 30, in turn, drives the mechanical assembly. The converted power comprises inter-harmonic currents having additional frequency components at inter-harmonic frequencies that are unequal to integer multiples of the source frequency. These additional frequency components are generated in the frequency converter. However, according to the invention, fluctuations are imposed on the inter-harmonic frequencies, independently from any torsional excitation in the mechanical assembly and the AC power source.

The fluctuations do not need to be fast compared to the inter-harmonic frequencies. For instance, if the fluctuations are applied by repeatedly and periodically changing the inter-harmonic frequencies according to a pre-determined change pattern, the frequency of the change pattern (i.e. 1/period) may be at least 10 times lower than the lowest inter-harmonic frequency if no fluctuation were imposed.

To demonstrate the invention, a model has been programmed in MATLAB Simulink to represent an AC power source comprising a power generation assembly consisting of a gas turbine driving a generator. The power generation assembly has been modelled according to a four mass model providing inertia. The four masses are coupled one after another by a shaft that is modelled in the form of a torsion damper and a torsion spring. Herewith oscillatory behaviour between the masses can be modelled.

The parameters used for the four mass model correspond to those of an Alstom GT132 gas turbine generator and are listed in Table 1 below. In the Table, $J_n$ denotes the moment of inertia of the n-th mass element, $K_{nm}$ denotes the coefficient of the torsion spring between the n-th and m-th mass element, and $D_{nm}$ the coefficient of torsion damping between the n-th and m-th mass element. The four mass model has been excited by various excitation signals.

TABLE 1

| | Value | Represents |
|---|---|---|
| $J_1$ | $2.234 \times 10^3$ kgm$^2$ | Generator |
| $J_2$ | $2.893 \times 10^3$ kgm$^2$ | Generator |

TABLE 1-continued

| | Value | Represents |
|---|---|---|
| $J_3$ | $1.512 \times 10^4$ kgm$^2$ | Compressor |
| $J_4$ | $9.52 \times 10^3$ kgm$^2$ | Turbine |
| $K_{12}$ | $9.400 \times 10^5$ kNm/rad | |
| $K_{23}$ | $3.793 \times 10^4$ kNm/rad | |
| $K_{34}$ | $2.660 \times 10^6$ kNm/rad | |
| $D_{12}$ | 1743 Nms/rad | |
| $D_{23}$ | 647.0 Nms/rad | |
| $D_{34}$ | 6361 Nms/rad | |

Figure 7:
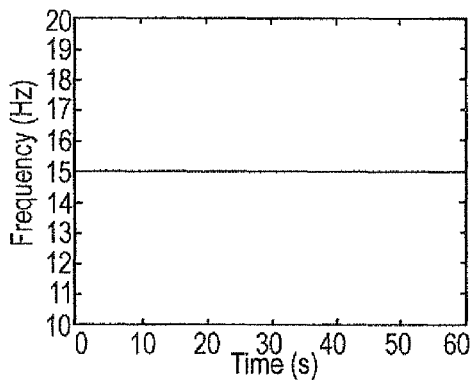
FIG. 7 shows a plot of frequency of an excitation signal as function of time for a time-independent frequency, wherein time is plotted on the horizontal axis on a linear scale between 0 and 60 s and the frequency is plotted on the vertical axis on a linear scale between 10 and 20 Hz.

Referring now to FIG. 7, there is shown a unmodulated excitation signal having a constant frequency of 14.973 Hz which is at or very close to a torsional resonance frequency between the second and third mass elements of the four mass model. This could be the frequency of an inter-harmonic current if the drive frequency is chosen close to the source frequency. Normally, drive frequencies close to the source frequencies are in a so-called exclusion range where system may not be continuously operated.

Figure 8:
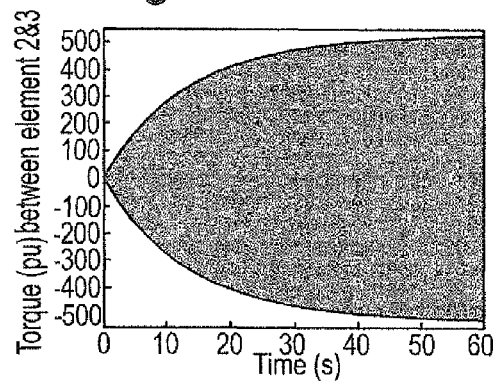
FIG. 8 shows a plot of the torque (in per unit quantity) between elements 2 and 3 of a four mass model over time when excited during 60 s with the excitation signal of FIG. 7, wherein time is plotted on the horizontal axis on a linear scale between 0 and 60 s and the torque is plotted on the vertical axis on a linear per-unit scale between 550 and −550 pu whereby each tick mark corresponds to 100 pu.

The resulting calculated torque between the second and third element as a function of time is shown in FIG. 8. This is the reference case to show what may happen if no precaution is taken. Without taking any precaution against excitation of torsional resonances, it would generally not be possible to drive the electric motor at this frequency for any prolonged duration of time.

Figure 9:
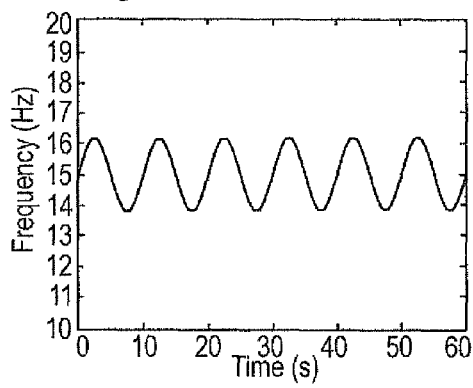
FIG. 9 shows a plot of frequency of an excitation signal as function of time for a sinusoidally modulated frequency with a modulation period of 10 s, wherein time is plotted on the horizontal axis on a linear scale between 0 and 60 s and the frequency is plotted on the vertical axis on a linear scale between 10 and 20 Hz.
Figure 10:
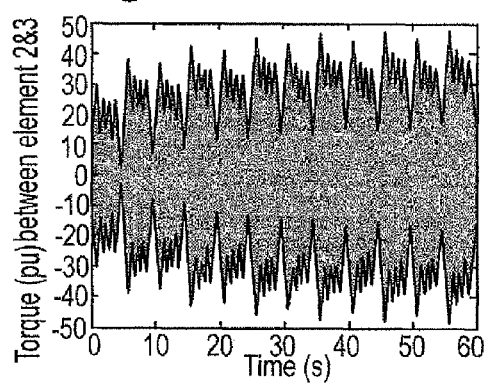
FIG. 10 shows a plot of the torque (in per unit quantity) between elements 2 and 3 of the four mass model over time when excited during 60 s with the excitation signal of FIG. 9, wherein time is plotted on the horizontal axis on a linear scale between 0 and 60 s and the torque is plotted on the vertical axis on a linear per-unit scale between 50 and −50 pu.

FIGS. 9 and 10 show what may happen if the inter-harmonic frequency is fluctuated by repeatedly and periodically increasing and decreasing the frequency by 1.2 Hz according to a sinusoidal pattern having a period of 10 s. The excitation current is displayed in FIG. 9 and the resulting torque between the second and third mass elements is shown in FIG. 10. As can be seen, the maximum torque has been reduced by a factor of about 10.

It has been found that the effectiveness of the fluctuation on the torque resonance excitation depends on the period and magnitude of the variation in the inter-harmonic (excitation) frequency. A case study may therefore be beneficial to uncover for each specific line-up what the best modulation parameters are for each drive frequency.

This has been done empirically (by trial and error) for sinusoidially modified excitations of the present four mass model at a range of central excitation frequencies (i.e. the time-averaged excitation frequency) around the torsional resonance. The results are given in Table 2. The first column in the Table lists the central frequency and the second column the amount by which the frequency maximally increased and decreased from the central frequency by the sinusoidal deviation (i.e. the "amplitude" of the modulation). The period of the modulation is listed in the third column and the resulting maximum torque in the coupling between the second and third elements is listed in the fourth column.

TABLE 2

| Excitation frequency (Hz) | Modulation amplitude (Hz) | Modulation periodicity (s) | Maximum torque (pu) |
|---|---|---|---|
| 14.80 | 0.6 | 2 | 55 |
| 14.85 | 0.9 | 3 | 30 |
| 14.90 | 1.2 | 5.33 | 55 |
| 14.95 | 1.5 | 8.33 | 70 |
| 15.00 | 1.8 | 12 | 50 |
| 15.05 | 1.5 | 8.33 | 55 |
| 15.10 | 1.2 | 5.33 | 50 |

TABLE 2-continued

| Excitation frequency (Hz) | Modulation amplitude (Hz) | Modulation periodicity (s) | Maximum torque (pu) |
|---|---|---|---|
| 15.15 | 0.9 | 3 | 40 |
| 15.20 | 0.6 | 2 | 50 |

It can be seen that the modulation frequency (i.e. inverse value of the modulation periodicity) in this case is between about 0.08 Hz and 0.5 Hz, between about 30 and 200 times lower than the unmodulated inter-harmonic frequency of about 15 Hz. Furthermore, the modulation amplitude is less than 2.0 Hz. This means, for a 6 pulse inverter the drive speed needs to fluctuate less than 20 rpm at a nominal (average) drive speed of 3600 rpm.

Other modulation patterns may be employed instead of the sinusoidal one.

Figure 11:
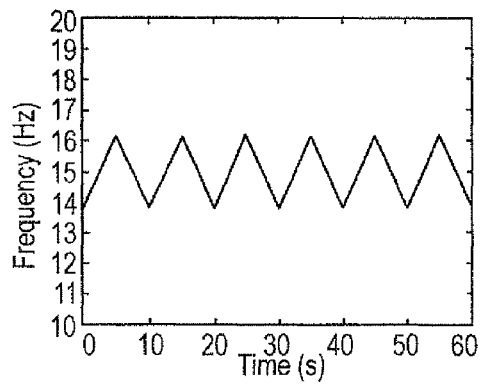
FIG. 11 shows a plot of frequency of an excitation signal as function of time for a saw-tooth modulated frequency with a modulation period of 10 s, wherein time is plotted on the horizontal axis on a linear scale between 0 and 60 s and the frequency is plotted on the vertical axis on a linear scale between 10 and 20 Hz.
Figure 12:
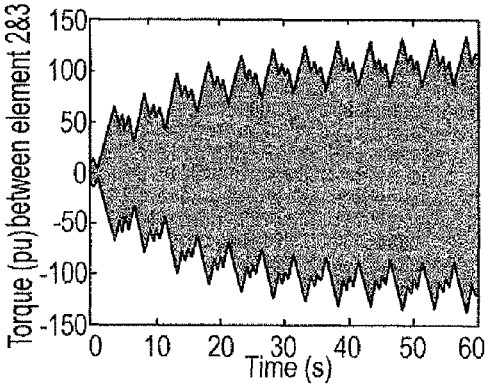
FIG. 12 shows a plot of the torque (in per unit quantity) between elements 2 and 3 of the four mass model over time when excited during 60 s with the excitation signal of FIG. 11, wherein time is plotted on the horizontal axis on a linear scale between 0 and 60 s and the torque is plotted on the vertical axis on a linear per-unit scale between 150 and −150 pu.

FIGS. 11 and 12 demonstrate a saw-tooth modulation with the same magnitude and periodicity as the sinusoidal modulation of FIG. 9. As can be seen, the maximum torque is still reduced by about a factor of 5, but the reduction is less than in the sinusoidal modulation pattern.

Figure 13:
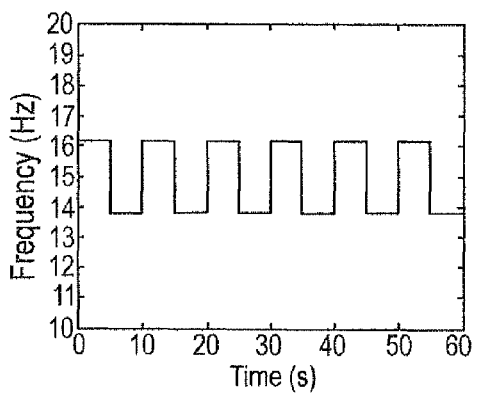
FIG. 13 shows a plot of frequency of an excitation signal as function of time for a square-wave modulated frequency with a modulation period of 10 s, wherein time is plotted on the horizontal axis on a linear scale between 0 and 60 s and the frequency is plotted on the vertical axis on a linear scale between 10 and 20 Hz.
Figure 14:
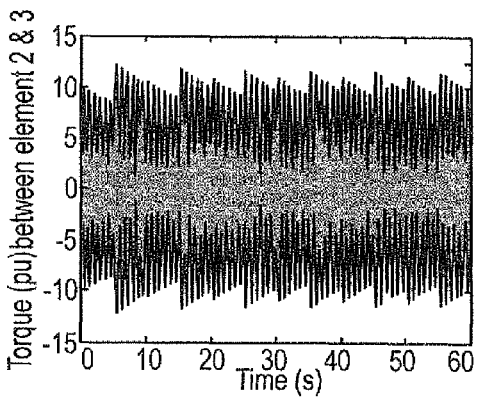
FIG. 14 shows a plot of the torque (in per unit quantity) between elements 2 and 3 of the four mass model over time when excited during 60 s with the excitation signal of FIG. 13, wherein time is plotted on the horizontal axis on a linear scale between 0 and 60 s and the torque is plotted on the vertical axis on a linear per-unit scale between 15 and −15 pu.

A block-wave modulation pattern is tested in FIGS. 13 and 14, again with the same magnitude of 1.2 Hz up and down and periodicity of 10 s, and in this case the torque reduction is almost 5× better than in the sinusoidal case. However, it is noted that this change pattern in the inter-harmonic frequency is not attainable with load commutated inverters in practice, due to the inertia of the mechanical assembly and the electric motor that drives the mechanical assembly.

One way of accomplishing the fluctuations in the inter-harmonic frequency is by modulating the drive frequency. The drive frequency may for instance be changed around an average drive frequency according to a time-dependent deviation from the average frequency. The electric modulation circuitry 23 may suitably be integrated in the speed controller 26 of the variable speed drive system. The electric motor rotates at a speed controlled by the speed controller. The speed controller interacts with the frequency converter via a speed control signal 28, which can be periodically changed in accordance with a desired repetitive pattern.

In a preferred embodiment, the speed controller may be programmed to periodically change the speed control signal around an average speed control signal according to a time-dependent deviation from the average speed control signal, in order to cause the desired fluctuations in the inter-harmonic frequencies.

When driving a refrigerant compressor for a refrigeration process, small variations in the motor speed go practically unnoticed for the actual refrigeration process but can be hugely advantageous to prevent excessive torsional excitations. Moreover, the required magnitude of fluctuations in the drive frequency can be significantly smaller than the desired magnitude of the fluctuations in the inter-harmonic frequencies. For instance, if the drive frequency is regulated via source rectifier firing pulses using an N-pulse rectifier, the actual fluctuation in drive frequency can be N× smaller than the desired fluctuations in the inter-harmonic frequencies. In practice, the speed at which the electric motor rotates needs to be fluctuated from an average speed by less than by 100 rpm in case of a 6-pulse rectifier, and less than by 50 rpm in case of a 12-pulse rectifier. Either way, this is a relatively small amount compared to nominal drive speeds of 3000 or 3600 rpm.

While FIGS. 7 to 14 above were used to investigate the principle of repeatedly and periodically changing an excitation frequency that is close to a torsional resonance, FIGS. 15 to 20 demonstrate various modulations imposed by the electric modulation circuitry on the speed controller. To this end, the LCI of FIG. 5 has been added to the MATLAB model.

Figure 15:
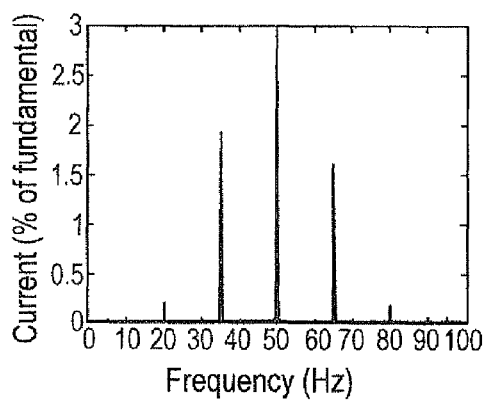
FIG. 15 shows a plot of an input current spectrum, obtained under constant motor speed and stationary inverter firing angle, wherein frequency is plotted on the horizontal axis on a linear scale between 0 and 100 Hz and the current is plotted on the vertical axis on a linear scale of percentage of the current in the fundamental frequency between 0 and 3%.
Figure 16:
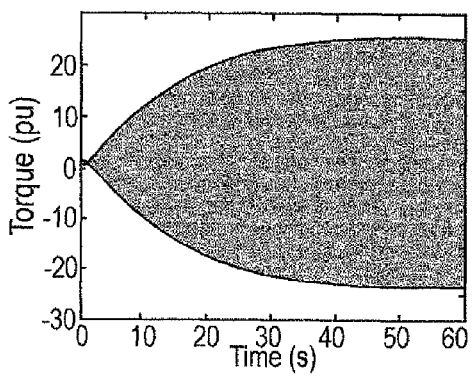
FIG. 16 shows a plot of the torque (in per unit quantity) between elements 2 and 3 of the four mass model over time when excited with the inverter of FIG. 5 during 60 s with the input current spectrum of FIG. 15, wherein time is plotted on the horizontal axis on a linear scale between 0 and 60 s and the torque is plotted on the vertical axis on a linear per-unit scale between 30 and −30 pu.

FIGS. 15 and 16 refer to a reference case whereby the electric motor is driven at constant speed. FIG. 15 shows the calculated input current spectrum of the LCI. The inter-harmonic frequencies are clearly visible. The resulting torque on the coupling between the second and third mass elements of the four mass model is shown in FIG. 16.

Typically, the proposed drive frequency has a time-independent average frequency and a time-dependent deviation from the average frequency. The time-dependent deviation may stay within a maximum deviation from the time-independent average frequency of between 3% and 15%.

Figure 17:
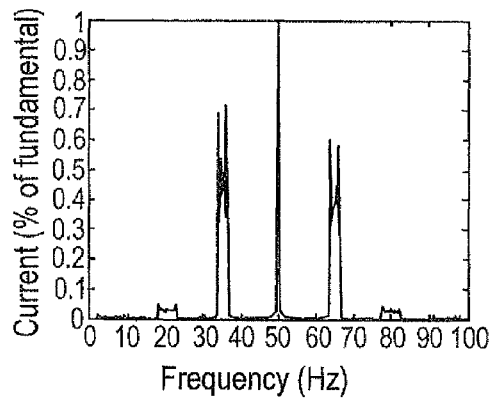
FIG. 17 shows a plot of another input current spectrum, obtained by a sinusoidal drive frequency variation with a period of 10 s, wherein frequency is plotted on the horizontal axis on a linear scale between 0 and 100 Hz and the current is plotted on the vertical axis on a linear scale of percentage of the current in the fundamental frequency between 0 and 1%.
Figure 18:
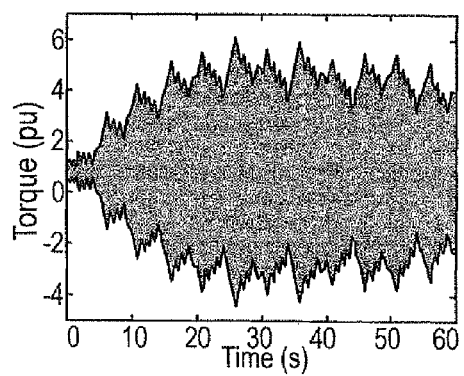
FIG. 18 shows a plot of the torque (in per unit quantity) between elements 2 and 3 of the four mass model over time when excited with the inverter of FIG. 5 during 60 s with the input current spectrum of FIG. 17, wherein time is plotted on the horizontal axis on a linear scale between 0 and 60 s and the torque is plotted on the vertical axis on a linear per-unit scale between 7 and −5 pu whereby each tick mark corresponds to 2 pu.

To accomplish the same sinusoidal frequency variation of 1.2 Hz over 10 s periods on the inter-harmonic frequency as was done in the FIGS. 9 and 10, a 0.1 Hz drive frequency variation over a 10 second period was offered as target to the speed controller. The resulting input current spectrum is shown in FIG. 17 and the resulting torque on the coupling between the second and third mass elements is shown in FIG. 18. The torque stays below 6 pu, which corresponds to an improvement of a factor of about 4.

While the electric motor may be able to keep up with this relatively slow variation in speed, it is impossible to vary the speed as a step. Nonetheless, it has been investigated what may happen if a block-wave speed variation is offered to the speed controller. Of course, the actual speed change and therefore the modulation of the inter-harmonic frequencies will not have the block-wave pattern as was assumed in FIG. 13, but as can be seen in FIGS. 19 and 20 the results are still very good. Disregarding a small starting transient, the torque is calculated to generally stay below 2 pu whereby an improvement factor of about 12.5 is achieved.

Another way of causing fluctuations in the inter-harmonic frequencies is by imposing fluctuations on a firing angle of the inverter firing pulses. In contrast to speed, the inverter firing angle can be changed (relative, for instance, to a motor phase angle) instantaneously, and therefore result in a more square-wave modification pattern in the inter-harmonic frequencies.

Similar to what has been described above, the firing angle can be described as having a time-independent average firing angle which is modified with a time-dependent deviation from the average firing angle. The method of time-dependent deviation preferably stays within a maximum deviation from the time-independent average firing angle of between 0.5° and 10°. Smaller fluctuations in firing angle are unlikely to suppress the excitation of torsional resonances, while larger fluctuations in firing angle may cause stability problems in the speed controller.

To test the influence of the inverter firing angle, the model described above is used whereby a square waveform is applied to the inverter firing angle input. A good result has been achieved with a square wave to apply a block wave consisting of 2° increase and 2° decrease from a standard firing angle over periods of 1 s. The electric motor speed was set at 48.75 Hz, which is expected to excite a torsional resonance on the coupling between mass elements two and three. The input current spectrum and the resulting torque are respectively shown in FIGS. 21 and 22.

The skilled person will understand that the proposed methods may be applied in combination with other torsional resonance excitation mitigation strategies. For instance, it could be contemplated to install mechanical damping to selected drive shafts, for instance in the form of elastomeric dampers. However, even with such dampers being provided the invention can be beneficial as with the invention operative such dampers are expected degrade less fast.

The variable speed drive system and the methods of its operation may be employed for driving a load in the form of a compressor. The invention can then be advantageously applied in methods of refrigerating a hydrocarbon stream. Herein, a refrigerant fluid is cycled between compressing the refrigerant fluid with the compressor and cooling the hydrocarbon stream by heat exchanging the hydrocarbon stream against the refrigerant fluid. The refrigeration may cause condensation of the hydrocarbon stream and a liquefied hydrocarbon stream may be produced this way, such as a liquefied natural gas stream.

Such methods are illustrated with help of FIG. 23, wherein an apparatus for refrigerating a hydrocarbon stream is show. It employs the variable speed drive system of FIG. 1. The load 40 is presented in the form of a compressor which forms part of a refrigerant circuit 100. The refrigerant circuit 100 comprises a heat rejecter 110, a pressure reduction device 120 to lower the pressure of the refrigeration fluid to refrigeration pressure, and a refrigeration heat exchanger 80.

The compressor compresses the refrigeration fluid. The heat rejecter rejects heat from the compressed refrigerant fluid, ultimately to the ambient although an optional intermediate fluid may be used. The pressure reduction device 120 is here depicted as a Joule-Thomson valve but it may be provided in the form of an expander turbine or a combination of an expander turbine and a J-T valve.

In the refrigeration heat exchanger 80 heat can pass from the hydrocarbon stream 90, which also passes through the refrigeration heat exchanger 80, to the refrigerant fluid which heats up as the hydrocarbon stream cools down. A refrigerated hydrocarbon stream 95 and a heated refrigerant fluid 130 are expelled from the refrigeration heat exchanger 80. The heated refrigerant fluid 130 is then passed to the compressor for recompression and its cycle is complete.

The refrigeration heat exchanger 80 and the refrigerant circuit 100 have been depicted very schematically. They can represent any suitable refrigeration technique, including those used in hydrocarbon liquefaction processes, in particular any natural gas liquefaction process producing liquefied natural gas. Furthermore, the invention is not limited by the specific choice of heat exchanger.

Examples of suitable refrigeration techniques are derivable from single refrigerant cycle processes (usually single mixed refrigerant—SMR—processes, such as PRICO described in the paper "LNG Production on floating platforms" by K R Johnsen and P Christiansen, presented at Gastech 1998 (Dubai), but also possible is a single component refrigerant such as for instance the BHP-cLNG process also described in the afore-mentioned paper by Johnsen and Christiansen); double refrigerant cycle processes (for instance the much applied Propane-Mixed-Refrigerant process, often abbreviated C3MR, such as described in for instance U.S. Pat. No. 4,404,008, or for instance double mixed refrigerant—DMR—processes of which an example is described in U.S. Pat. No. 6,658,891, or for instance two-cycle processes wherein each refrigerant cycle contains a single component refrigerant); and processes based on three or more compressor trains for three or more refrigeration cycles (an example is described in U.S. Pat. No. 7,114,351). Other examples of suitable refrigeration techniques are described in: U.S. Pat. No. 5,832,745 (Shell SMR); U.S. Pat. No. 6,295,833; U.S. Pat. No. 5,657,643 (both are variants of Black and Veatch SMR); U.S. Pat. No. 6,370,910 (Shell DMR). Another suitable example of DMR is the so-called Axens LIQUEFIN process, such as described in for instance the paper entitled "LIQUEFIN: AN INNOVATIVE PROCESS TO REDUCE LNG COSTS" by P-Y Martin et al, presented at the $22^{nd}$ World Gas Conference in Tokyo, Japan (2003). Other suitable three-cycle processes include for example U.S. Pat. No. 6,962,060; WO 2008/020044; U.S. Pat. No. 7,127,914; DE3521060A1; U.S. Pat. No. 5,669,234 (commercially known as optimized cascade process); U.S. Pat. No. 6,253,574 (commercially known as mixed fluid cascade process); U.S. Pat. No. 6,308,531; US application publication 2008/0141711; Mark J. Roberts et al "Large capacity single train AP-X™ Hybrid LNG Process", Gastech 2002, Doha, Qatar (13-16 Oct. 2002).

These suggestions are provided to demonstrate wide applicability of the invention, and are not intended to be an exclusive and/or exhaustive list of possibilities. Not all examples listed above employ electric motors as refrigerant compressor drivers. It will be clear that any drivers other than electric motors can be replaced for an electric motor to be suitable for application in the context of the present invention. Furthermore, in known refrigeration techniques compressors for refrigerant fluids are often driven by a gas turbine supplemented with an electric motor functioning as helper motor. Also in these cases the invention can be applied.

The hydrocarbon stream to be refrigerated may initially be vaporous. It may be derived from any suitable gas stream to be refrigerated and optionally liquefied. An often used example is a natural gas stream, obtained from natural gas or petroleum reservoirs or coal beds. As an alternative the hydrocarbon stream 90 may also be obtained from another source, including as an example a synthetic source such as a Fischer-Tropsch process.

The person skilled in the art will understand that the present invention can be carried out in many various ways without departing from the scope of the appended claims.

The invention claimed is:

1. A method of operating a variable speed drive system comprising an electric motor and a frequency converter arranged between an AC power source and the electric motor, the frequency converter being coupled to the AC power source via a power line, and the electric motor being coupled to the frequency converter via an electric line, the method comprising the steps of:

employing the frequency converter to convert AC power obtained from the AC power source at a source frequency to converted power at a variable drive frequency that is unequal to the source frequency, wherein the converted power comprises inter-harmonic currents having additional frequency components at inter-harmonic frequencies that are unequal to integer multiples of the source frequency;

powering the electric motor with the converted power via the electric line;

driving a mechanical assembly comprising at least a drive shaft and a mechanical load with the electric motor via the drive shaft;

modulating the variable drive frequency to cause fluctuations in the inter-harmonic frequencies independently from any torsional excitation in the mechanical assembly and the AC power source, wherein the electric motor rotates at a speed that is controlled by a speed controller that interacts with the frequency converter via a speed control signal, wherein said modulating the variable drive frequency to cause fluctuations in the inter-harmonic frequencies comprises periodically changing the speed control signal around an average speed control signal according to a time-dependent deviation from the average speed control signal, wherein the speed at which the electric motor rotates is fluctuated from the average speed by less than 100 rpm.

2. The method of claim 1, wherein said fluctuations may be imposed in accordance with a pre-determined pattern of fluctuations.

3. The method of claim 1, wherein said causing of fluctuations in the inter-harmonic frequencies consists of repeatedly and periodically changing the inter-harmonic frequencies.

4. The method of claim 1, wherein the fluctuations in a selected inter-harmonic frequency stay within a maximum deviation of between 3% and 15% from the frequency of the selected inter-harmonic frequency in case it were unfluctuated.

5. The method of claim 1, wherein said modulating the variable drive frequency to cause fluctuations in the inter-harmonic frequencies comprises changing the variable drive frequency around an average drive frequency according to a time-dependent deviation from the average drive frequency, the time-dependent deviation from the average drive frequency staying within a maximum deviation from the average drive frequency of between 3% and 15%.

6. The method of claim 1, wherein the speed control signal is modified according to a square wave pattern.

7. The method of claim 1, wherein the speed at which the electric motor rotates is fluctuated from the average speed by less than 20 rpm.

8. The method of claim 1, wherein converting of said AC power to converted power comprises forming a rectified signal by rectifying said AC power and converting said rectified signal to said converted power using an inverter comprising switching components activated by firing pulses, wherein said causing of fluctuations in the inter-harmonic frequencies comprises periodically changing a firing angle of the firing pulses around an average firing angle according to a time-dependent deviation from the average firing angle, wherein the time-dependent deviation from the average firing angle stays within a maximum deviation from the average firing angle of between 0.5° and 10°.

9. The method of claim 1, wherein said modulating the variable drive frequency to cause fluctuations in the inter-harmonic frequencies comprises modulating the inter-harmonic frequencies in accordance with a pre-determined wave form.

10. The method according to claim 9, wherein the pre-determined wave form varies in a pre-determined way as a function of drive frequency.

11. A method of refrigerating a hydrocarbon stream, comprising the steps of:
operating a variable speed drive system in accordance with a method as defined in claim 1, wherein the mechanical load comprises a compressor;
cycling a refrigerant fluid between compressing the refrigerant fluid with the compressor and cooling the hydrocarbon stream by heat exchanging the hydrocarbon stream against the refrigerant fluid.

12. A variable speed drive system, comprising:
an electric motor;
a frequency converter arranged between an AC power source and the electric motor, the frequency converter being coupled to the AC power source via a power line and the electric motor being coupled to the frequency converter via an electric line, to convert AC power obtained from the AC power source at a source frequency to converted power at a variable drive frequency that is unequal to the source frequency;
a mechanical assembly comprising at least a drive shaft and a mechanical load, the mechanical assembly being coupled to the electric motor via the drive shaft; and
electric modulation circuitry interacting with the frequency converter and arranged to modulate the variable drive frequency to cause fluctuations, independently from any torsional excitation in the mechanical assembly and the AC power source, in the inter-harmonic frequencies of interharmonic currents generated in the frequency converter, the electric modulation circuitry forming part of a speed controller which is arranged to interact with the frequency converter via a speed control signal,
the electric motor being arranged to rotate at a speed that is controlled by the speed controller via the speed control signal, said electric modulation circuitry being arranged to modulate the variable drive frequency to cause fluctuations in the inter-harmonic frequencies by periodically changing the speed control signal around an average speed control signal according to a time-dependent deviation from the average speed control signal, the electric circuitry being arranged to fluctuate the speed at which the electric motor rotates from the average speed by less than 100 rpm.

\* \* \* \* \*